(12) United States Patent
Phillips

(10) Patent No.: US 7,996,822 B2
(45) Date of Patent: Aug. 9, 2011

(54) USER/PROCESS RUNTIME SYSTEM TRACE

(75) Inventor: Brent Russel Phillips, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 11/291,542

(22) Filed: Dec. 1, 2005

(65) Prior Publication Data

US 2007/0130119 A1    Jun. 7, 2007

(51) Int. Cl.
*G06F 9/44* (2006.01)
*G06F 11/00* (2006.01)

(52) U.S. Cl. .... 717/128; 717/127; 714/38.1; 714/38.14; 714/45

(58) Field of Classification Search ................. 717/128; 714/48, 45
See application file for complete search history.

(56) References Cited

U.S. PATENT DOCUMENTS

| | | | |
|---|---|---|---|
| 5,471,526 | A |  11/1995 | Linnermark et al. |
| 5,790,977 | A |  8/1998 | Ezekiel |
| 6,083,281 | A * |  7/2000 | Diec et al. ................. 717/128 |
| 6,202,199 | B1 * |  3/2001 | Wygodny et al. ........... 717/125 |
| 6,266,709 | B1 |  7/2001 | Gish |
| 6,282,701 | B1 |  8/2001 | Wygodny et al. |
| 6,357,019 | B1 |  3/2002 | Blaisdell et al. |
| 6,553,403 | B1 |  4/2003 | Jarriel et al. |
| 6,738,965 | B1 |  5/2004 | Webster |
| 7,114,104 | B1 * |  9/2006 | Bennett ..................... 714/38 |
| 7,206,385 | B2 |  4/2007 | Ethier et al. |
| 2003/0005021 | A1 |  1/2003 | Shah et al. |
| 2003/0200301 | A1 |  10/2003 | Trzcinko et al. |
| 2004/0260758 | A1 |  12/2004 | Hirata et al. |
| 2005/0222817 | A1 * |  10/2005 | Achacoso et al. ........... 702/185 |

FOREIGN PATENT DOCUMENTS

GB    2365553 A    2/2002

OTHER PUBLICATIONS

U.S. Appl. No. 11/291,548, filed Dec. 1, 2005, Morgan et al.
Wolczko, "Using a Tracing Java Virtual Machine to Gather Data on the Behavior of Java Programs", Mar. 1999, pp. 1-14, retrieved Apr. 6, 2006 http://research.sun.com/people/mario/tracing-jvm/tracing.pdf.
USPTO Office action for U.S. Appl. No. 11/291,548 dated Oct. 28, 2009.
USPTO final office action for U.S. Appl. No. 11/291,548 dated Aug. 12, 2010.

* cited by examiner

*Primary Examiner* — Tuan Q Dam
*Assistant Examiner* — Todd Aguilera
(74) *Attorney, Agent, or Firm* — Yee & Associates, P.C.; Mark C. Vallone

(57) ABSTRACT

A tracer object for tracing a user or process in a data processing system is provided. An application receives a tracer key containing a request for information to be traced. The received tracer key is checked against all tracer keys that the application has stored. If a match between two tracer keys is found, the stored tracer key maps the tracer key containing the request to the stored tracer key's associated tracer object and applies the conditions and modifiers contained in the tracer key containing the request to the tracer object. The tracer object then gathers the required information as requested.

20 Claims, 3 Drawing Sheets

USER/PROCESS RUNTIME SYSTEM TRACE

BACKGROUND OF THE INVENTION

1. Field of the Invention

The present invention relates generally to data processing systems and, in particular, to a method, system, and computer program product for tracing a particular user or process in a data processing system.

2. Description of the Related Art

Modern computing technology has resulted in immensely complicated and ever-changing environments. One such environment is the Internet, which is also referred to as an "internetwork." The Internet is a set of computer networks, possibly dissimilar, joined together by means of gateways that handle data transfer and the conversion of messages from a protocol of the sending network to a protocol used by the receiving network. When capitalized, the term "internet" refers to a collection of networks and gateways that use the TCP/IP suite of protocols. Currently, the most commonly employed method of transferring data over the Internet is to employ the World Wide Web environment, also called the "Web". Other internet resources exist for transferring information, such as File Transfer Protocol (FTP) and Gopher, but have not achieved the popularity of the Web. In the Web environment, servers and clients effect data transactions using the Hypertext Transfer Protocol (HTTP), a known protocol for handling the transfer of various data files such as text, still graphic images, audio, motion video, etc. HTTP is made up of header information and content. HTTP allows for the creation of custom headers. The information in various data files is formatted for presentation to a user by a standard page description language, the Hypertext Markup Language (HTML). The Internet also is used widely to transfer applications to users using browsers. Often times, users may search for and obtain software packages through the Internet.

Other types of complex network data processing systems include those created for facilitating work in large corporations. In many cases, these networks may span across regions in various worldwide locations. These complex networks also may use the Internet as part of a virtual product network for conducting business. These networks are further complicated by the need to collect and analyze data concerning software application errors that occur within the network.

Often, software applications exhibit problems that only occur in a specific customer environment. This makes duplication of the problem in a controlled environment difficult if not impossible until the nature of the problem is determined. Unfortunately, the information necessary to isolate the exact nature of the problem can be difficult to obtain because enabling logging and/or trace information can significantly modify the runtime behavior of the system.

In this situation, the additional overhead and modified runtime execution path of the logging and trace infrastructure can prevent the problem from reoccurring, or cause additional problems to arise that are not relevant to resolving the outstanding problem. This makes it even more costly.

SUMMARY OF THE INVENTION

The present invention provides a method, system, and computer program product for tracing a user or process in a data processing system. A request tracer key containing criteria for what is to be traced is received. The criteria of the request tracer key is compared to a criteria of at least one stored tracer key to determine if a match condition exists. Responsive to a determination that a match condition does exist, a tracer object is modified to gather requested information and the requested information is gathered.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
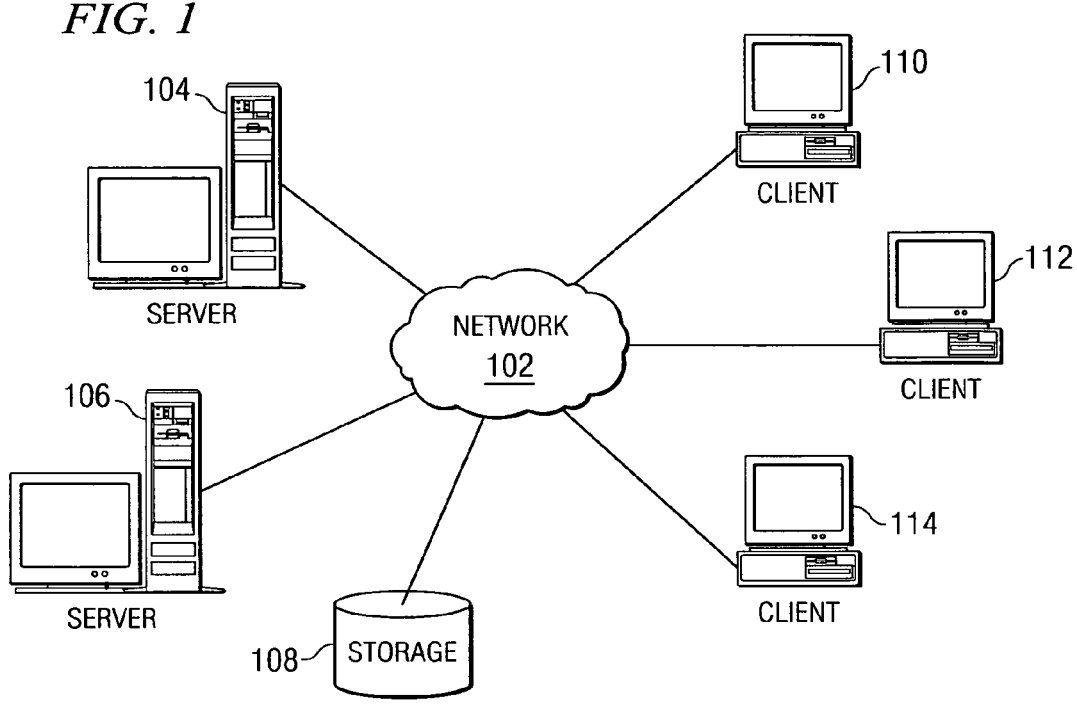
FIG. 1 is a pictorial representation of a network of data processing systems in which exemplary aspects of the present invention may be implemented.
Figure 2:
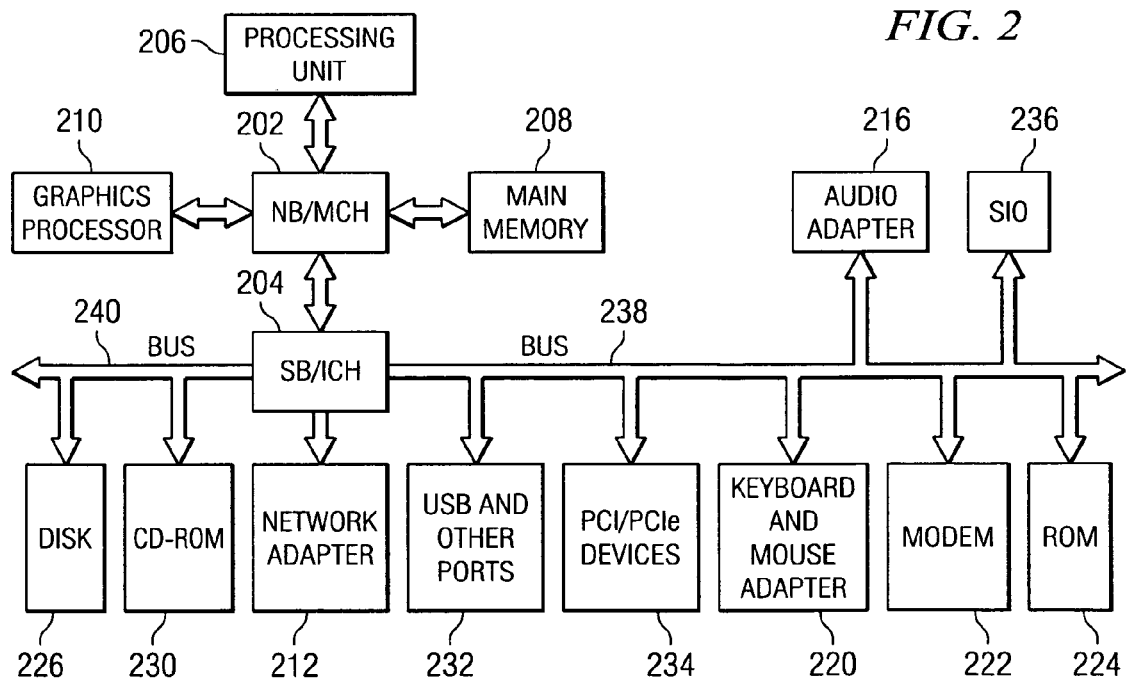
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eserver™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
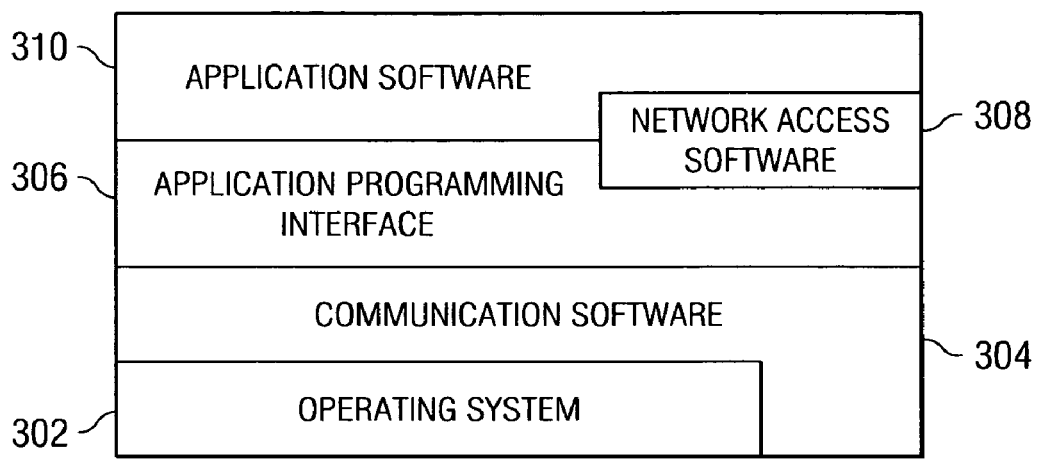
FIG. 3 is a block diagram depicting typical software architecture for a server-client system in which exemplary aspects of the present invention may be implemented.

Turning to FIG. 3, typical software architecture for a server-client system is depicted in which exemplary aspects of the present invention may be implemented. At the lowest level, operating system 302 is utilized to provide high-level functionality to the user and to other software. Such an operating system typically includes a basic input output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Figure 4:
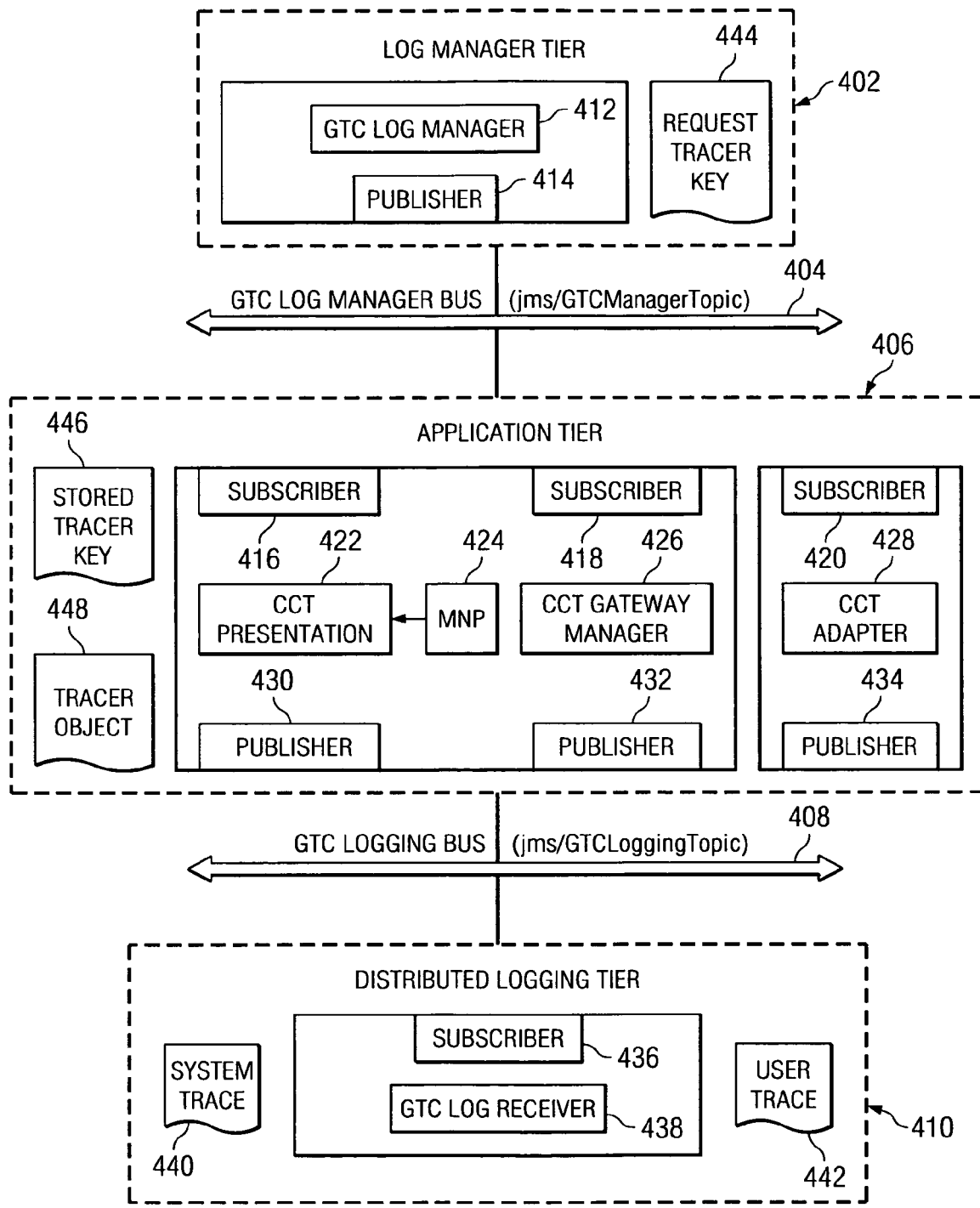
FIG. 4 is a block diagram depicting a system allowing a full debug level tracing in accordance with an exemplary embodiment of the present invention.

Application software 310 represents any number of software applications designed to react to data through the communications port to provide the desired functionality the user seeks, such as log manager 412 or log receiver 438 in FIG. 4. Applications at this level may include those necessary to handle data, video, graphics, photos or text, which can be accessed by users of the Internet.

Tracking system errors can be difficult, particularly in a production system. Often full level debugging tracing impacts system performance. Filters can be used but this impacts system performance as each debug message needs to be considered and accepted or rejected, as the case may be, by the filter. By tracing a user or process without impacting system performance, performance issues can be reviewed at a very low level without increasing overhead or impacting the performance of the general system.

In an exemplary embodiment of the present invention, a tracer object is created that allows tracing at a very specific level, such as on a user identification, on a session, on a correlation, on an application, on an instance, on a process or on a thread identifier. The tracer object records information regarding the specified user or process and stores the information in a central location where the information may be examined at a later time. In an exemplary embodiment of the present invention the tracer object is implemented using the Java™ language. However, as anyone skilled in the art will recognize, the type of tracing system described herein may be implemented using any language with a cache manager or database to store the information being traced.

Each application creates its own tracer objects. The tracer objects are stored by the various applications themselves. For example, for the user identification JonesB, each application that the user had logged into would have a tracer object for that user. When an application creates a tracer object, it creates a tracer key associated with the object. All tracer keys created by an application are output to one location. Once an application decides to create a tracer object and tracer key, the tracer key is attached to a thread. In an exemplary embodiment of the present invention, applications are configured to automatically create new tracer objects and tracer keys every time a new user or process is detected.

In a default setting the tracer objects do not trace anything. However, once an application has received a request from another application to trace certain information, the settings of the appropriate tracer object are changed so that the tracer object begins gathering the requested data. The request application will send a tracer key, called the request tracer key out to other applications. A request tracer key contains the criteria describing what is to be traced, how and when to gather the information and where to send the information once the gathering is completed. When an application receives a request tracer key, the application checks the request against the application's own, stored tracer keys to determine if a match condition exists. The two keys will not match exactly, as the request tracer key has specific information regarding the tracing of information. However, the application looks for stored tracer keys that possess the same identifiers, such as user identification, thread identification, session identification, application name, etc. The application then maps the request tracer key to its tracer object, applying the proper conditions and modifications so that the object can begin gathering the required information.

FIG. 4 is a block diagram depicting a system allowing a full debug level tracing in accordance with an exemplary embodiment of the present invention. In an exemplary embodiment of the present invention the debug system comprises three tiers, log manager tier 402, application tier 406 and distributed logging tier 410. Log manager tier 402 communicates with application tier 406 through log manager bus 404. Application tier 406 communicates with distributed logging tier 410 through logging bus 408. Log manager tier 402 comprises log manager 412 and publisher 414.

In an exemplary embodiment of the present invention log manager 412 is implemented as a web page. A user fills out information on log manager 412 regarding what person or process is to be traced. Any combination of attributes can be traced from an individual user or user identification, to a specific process or program or even a specific user running a specific program. Once a user selects who or what is to be traced, request tracer key 444 is created. Publisher 414 publishes request tracer key 444 to subscribing programs in application tier 406 through subscribers 416, 418 and 420.

Application tier 406 comprises subscribers 416, 418, 420, common component technology (CCT) presentation 422, manage now problem (MNP) 424, CCT gateway manager 426, CCT adapter 428, and publishers 430, 432, and 434. CCT presentation 422, MNP 424, CCT gateway manager 426 and CCT adapter 428 are examples of types of components or software that may be traced or included in the tracing program. These programs are not necessary to the implementation of the present invention and are merely examples used for the present illustrative example and are not intended to imply any architectural limitation of the present invention, as any number of components could be included in the system. For example, rather than the multiple components shown in the present example, only one component may be involved in tracing. As a default setting, after the required information has been gathered by the various components, the information is passed on to distributed logging tier 410 by publishers 430, 432, 434. However, rather than publishing the information to logging tier 410, the gathered information could be passed in a variety of ways, such as by e-mail and or by saving the information to a specific file, etc.

Once an application has received request tracer key 444, the application checks the application's own stored tracer key(s) 446 to determine if any of stored tracer keys 446 match request tracer key 444. If a match is found, stored tracer key 446 maps request tracer key 444 to associated tracer object 448 and applies appropriate conditions or modifications to tracer object 448. In a default setting, tracer object 448 then gathers the requested information and publishes it to distributed logging tier 410.

Distributed logging tier 410 comprises subscriber 436, log receiver 438, system trace 440, and user trace 442. Subscriber 436 collects the tracing information and passes it to log receiver 438. Log receiver 438 parses all the information received and produces reports to be examined. In the depicted example system trace 440 contains general errors, default errors and error messages. User trace 442 is a report of the trace being performed.

It should be noted that the above described example uses a log manager to send requests to the applications in order to trigger the tracing by tracer objects. However, a log manager is just one generic type of program that could be used and is not meant in any way to limit the implementation of the present invention. Any sort of program can used to create a request and send it to an application possessing a tracer object, causing the tracer object to begin tracing.

Figure 5:
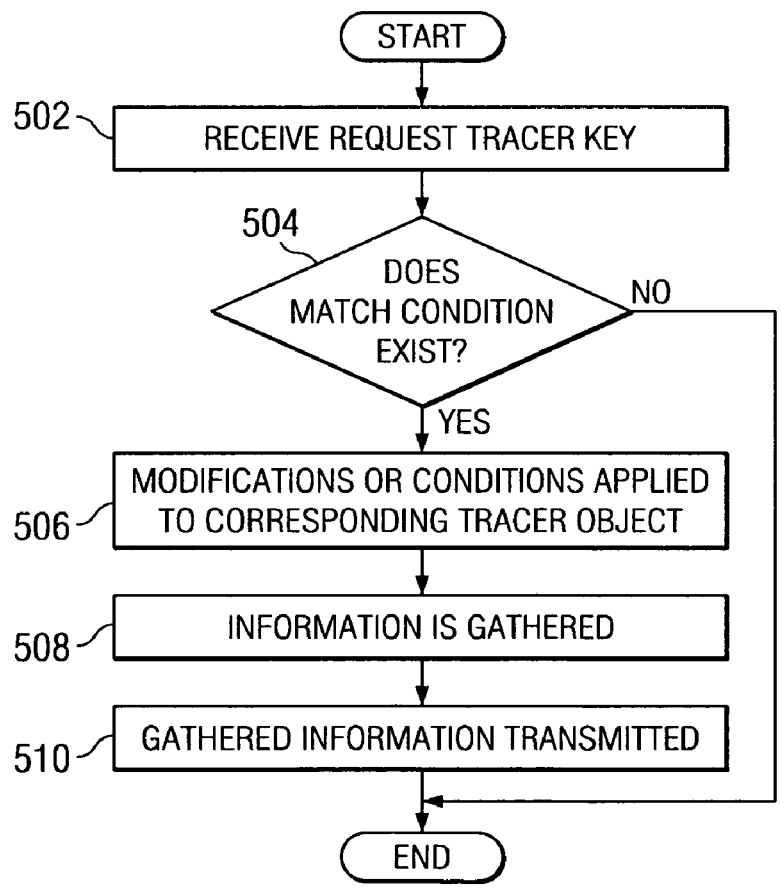
FIG. 5 is a flowchart illustrating the operation of debug tracing in accordance with an exemplary embodiment of the present invention.

In the depicted example, all the components may be implemented on the same data processing system or each component may be implemented on separate data processing systems, or any combination thereof. FIG. 5 is a flowchart illustrating the operation of debug tracing in accordance with an exemplary embodiment of the present invention. The operation begins when an application receives a request tracer key (step 502). The application checks all of its stored tracer keys to determine if a match condition exists (step 504). If a match condition does not exist (a no output to step 504), the operation ends. If a match condition does exist (a yes output to step 504), the stored tracer key maps the request tracer key to the corresponding tracer object and applies appropriate conditions or modifications (step 506). The tracer object then gathers the requested information (step 508). The gathered information is passed on to another application, which collects the information (step 510) and the process ends.

Thus the present invention allows the tracing at a very specific level, such as on a user identification, on a session, correlation, application, instance, process or thread identifiers. The tracer object records information regarding the specified user or process and stores the information in a central location where the information may be examined at a later time.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for tracing a particular user or process in a data processing system, the computer implemented method comprising:
   responsive to detecting a first application or a new user of the first application, generating by a processor a tracer, object and a stored tracer key, wherein the tracer object and the stored tracer key arc generated by the first application;
   storing the stored tracer key to form at least one stored tracer key;
   receiving by the processor a request tracer key from a second application, wherein the tracer key contains criteria;
   comparing by the processor the criteria of the request tracer key to criteria of the at least one stored tracer key to determine if a match condition exists;
   responsive to a determination that the match condition exists, modifying by the processor the tracer object to gather requested information, wherein modifying the tracer object includes mapping the request tracer key to the tracer object; and
gathering by the processor the requested information.

2. The computer implemented method of claim 1, further comprising:
   storing by the processor the requested information as it is being gathered in a database.

3. The computer implemented method of claim 1, further comprising:
   storing by the processor the requested information as it is being gathered in a cache manager.

4. The computer implemented method of claim 1, wherein the stored tracer key is attached to a thread.

5. The computer implemented method of claim 1, wherein each stored tracer key is associated with a specific tracer object.

6. The computer implemented method of claim 1, wherein the criteria comprises at least one of a user identification, a session, a correlation, an application, an instance, a process or a thread identifier.

7. The computer implemented method of claim 1, wherein the tracer object is modified according to information contained in the request tracer key.

8. A computer storage medium including computer usable program code encoded thereon for tracing a particular user or process in a data processing system, said computer storage medium including:
   computer usable program code, responsive to detecting a new user or a new application, for generating a tracer object and a stored tracer key, wherein the tracer object and the stored tracer key are generated at a first application;
   computer usable program code for storing the stored tracer key to form at least one stored tracer key;
   computer usable program code for receiving a request tracer key from a second application, wherein the tracer key contains criteria;
   computer usable program code for comparing the criteria of the request tracer key to criteria of the at least one stored tracer key to determine if a match condition exists;
   computer usable program code for responsive to a determination that the match condition exists, modifying the tracer object to gather requested information, wherein modifying the tracer object includes mapping the request tracer key to the tracer object; and
   computer usable program code for gathering the requested information.

9. The computer storage medium of claim 8, further comprising:
  computer usable program code for storing the requested information as it is being gathered in a database.

10. The computer storage medium of claim 8, further comprising:
  computer usable program code for storing the requested information as it is being gathered in a cache manager.

11. The computer storage medium of claim 8, wherein the stored tracer key is attached to a thread.

12. The computer storage medium of claim 8, wherein each stored tracer key is associated with a specific tracer object.

13. The computer storage medium of claim 8, wherein the criteria comprises at least one of a user identification, a session, a correlation, an application, an instance, a process or a thread identifier.

14. The computer storage medium of claim 8, wherein the tracer object is modified according to information contained in the request tracer key.

15. A data processing system for tracing a particular user or process in a data processing system, said data processing system comprising:
  a storage device, wherein the storage device stores computer usable program code; and
  a processor, wherein the processor executes the computer usable program code responsive to detecting a new user or a new application, to generate a tracer object and a stored tracer key, wherein the tracer object and the stored tracer key are generated at a first application; to store the stored tracer key to form at least one stored tracer key; to receive a request tracer key from a second application, wherein the tracer key contains criteria; to compare the criteria of the request tracer key to criteria of the at least one stored tracer key to determine if a match condition exists; responsive to a determination that the match condition exists, to modify the tracer object to gather requested information, wherein modifying the tracer object includes mapping the request tracer key to the tracer object; and gather the requested information.

16. The data processing system of claim 15, wherein the processor further executes computer usable program code for storing the requested information as it is being gathered in a database.

17. The data processing system of claim 15, wherein the processor further executes computer usable program code for storing the requested information as it is being gathered in a cache manager.

18. The data processing system of claim 15, wherein each stored tracer key is associated with a specific tracer object.

19. The data processing system of claim 15, wherein the criteria comprises at least one of a user identification, a session, a correlation, an application, an instance, a process or a thread identifier.

20. The data processing system of claim 15, wherein the tracer object is modified according to information contained in the request tracer key.

\* \* \* \* \*